US 6,743,539 B2

(12) United States Patent
Clingerman et al.

(10) Patent No.: US 6,743,539 B2
(45) Date of Patent: Jun. 1, 2004

(54) COOLANT FAN CONTROL FOR FUEL CELL SYSTEMS

(75) Inventors: Bruce J. Clingerman, Palmyra, NY (US); Donald H. Keskula, Webster, NY (US); Victor W. Logan, Naples, NY (US)

(73) Assignee: General Motors Corporation, Detroit, MI (US)

( * ) Notice: Subject to any disclaimer, the term of this patent is extended or adjusted under 35 U.S.C. 154(b) by 103 days.

(21) Appl. No.: 10/134,991

(22) Filed: Apr. 29, 2002

(65) Prior Publication Data

US 2003/0203255 A1 Oct. 30, 2003

(51) Int. Cl.7 .......................... H01M 8/04; H01M 8/00; F01P 9/02; F01P 7/10; F01P 7/04
(52) U.S. Cl. .............................. 429/24; 429/13; 429/26; 123/41.12; 123/41.49; 123/41.65
(58) Field of Search .............................. 429/13, 24, 26; 123/41.12, 41.29, 41.31, 41.48, 41.49, 41.51, 41.65

(56) References Cited

U.S. PATENT DOCUMENTS

| | | | |
|---|---|---|---|
| 5,375,582 A | 12/1994 | Wimer | 123/563 |
| 5,537,956 A | * 7/1996 | Rennfeld et al. | 123/41.29 |
| 6,006,731 A | 12/1999 | Uzkan | 123/563 |
| 6,198,176 B1 | 3/2001 | Gillette | 307/64 |
| 6,290,594 B1 | 9/2001 | Osborne | 454/75 |
| 6,448,535 B1 | * 9/2002 | Ap | 219/208 |
| 6,463,891 B2 | * 10/2002 | Algrain et al. | 123/41.12 |
| 6,528,194 B1 | * 3/2003 | Condit et al. | 429/26 |

OTHER PUBLICATIONS

Notification of Transmittal Of The International Search Report Or The Declaration, dated Jul. 11, 2003.

* cited by examiner

Primary Examiner—Patrick Ryan
Assistant Examiner—Thomas H. Parsons
(74) Attorney, Agent, or Firm—Cary W. Brooks; Linda M. Deschere

(57) ABSTRACT

A control system and method for operating a cooling fan in a coolant system of fuel cell power plant having a high temperature coolant loop and a low temperature coolant loop. The fan controller generates a fan control signal based on a first control signal from the high temperature coolant loop and a second control signal from the low temperature coolant loop. The first control signal is a function of the waste heat energy in the high temperature coolant loop, and the second control signal is a function of the temperature in the low temperature coolant loop. The fan control signal may also be generated based on a third control signal which is a function of a localized ambient temperature such as the under hood temperature of a vehicle.

24 Claims, 3 Drawing Sheets

COOLANT FAN CONTROL FOR FUEL CELL SYSTEMS

FIELD OF THE INVENTION

The present invention relates to a fuel cell power plant and more particularly to a control system for a fan in the coolant system of the fuel cell power plant.

BACKGROUND OF THE INVENTION

Fuel cell power plants have been proposed for use in vehicular applications to replace internal combustion engines, as well as in portable and stationary distributed electrical power generation applications. In such applications, the fuel cell power plant is a complex arrangement of systems which include a fuel processing system for locally generating hydrogen from a hydrocarbon fuel such as gasoline, a fuel cell stack for converting hydrogen and air to electrical energy and water, and a power train for converting electrical energy to mechanical energy. The various components of these systems generate heat which must be dissipated to maintain efficient, prolonged operation of the components of the fuel cell power plant.

A liquid to air coolant system is typically employed to extract heat from the fuel cell power plant and to dissipate the extracted heat into the environment. Such coolant systems employ a coolant loop which garners heat from various components in the fuel cell power plant. The coolant loop includes a heat exchanger such as a radiator to transfer heat from the heated coolant to air flowing through the heat exchanger. Often times a cooling fan is employed to facilitate the air flow through the heat exchanger. In this way the coolant system functions in a similar manner to the coolant system of a conventional vehicle having an internal combustion engine.

Control of the cooling fan in such conventional systems have been based on the temperature of the coolant at a given point in the coolant loop. Specifically, the cooling fan is disabled when the temperature of the coolant is below a threshold value and enabled when the temperature of the coolant is above the threshold value. While such controls may work adequately for certain operating states of a fuel cell power plant, it is not readily adaptable to the wide range of operating states that may be required, particularly where the fuel cell power plant has a relatively large turndown ratio to respond to transient load demands such as in a vehicular application.

Some applications may also employ multiple coolant loops for separate cooling of components having different thermal operating ranges. Such systems typically employ multiple radiators or radiator sections each having a dedicate fan assembly. Each coolant loop is operated independently of the other coolant loops resulting in additional mass and added complexity to the control of such cooling systems. Accordingly, there is a need to provide an efficient and simple coolant fan control system for fuel cell systems.

SUMMARY OF THE INVENTION

A control system and method according to the present invention controls the operation of the cooling fan in a coolant system having a first coolant loop and a second coolant loop. A fan controller generates a fan control signal based on a first input signal from the first coolant loop and a second input signal from the second coolant loop. The first input signal is a function of the waste heat energy in the first coolant loop, and the second input signal is a function of the temperature in the second coolant loop. The fan control signal may also be generated based on a third input signal which is a function of a localized ambient temperature such as the under hood temperature of a vehicle. The present invention enables operation of a single coolant fan assembly based on a plurality of independent input signals associated with various coolant subsystems in the fuel cell power plant.

Further areas of applicability of the present invention will become apparent from the detailed description provided hereinafter. It should be understood that the detailed description and specific examples, while indicating the preferred embodiment of the present invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
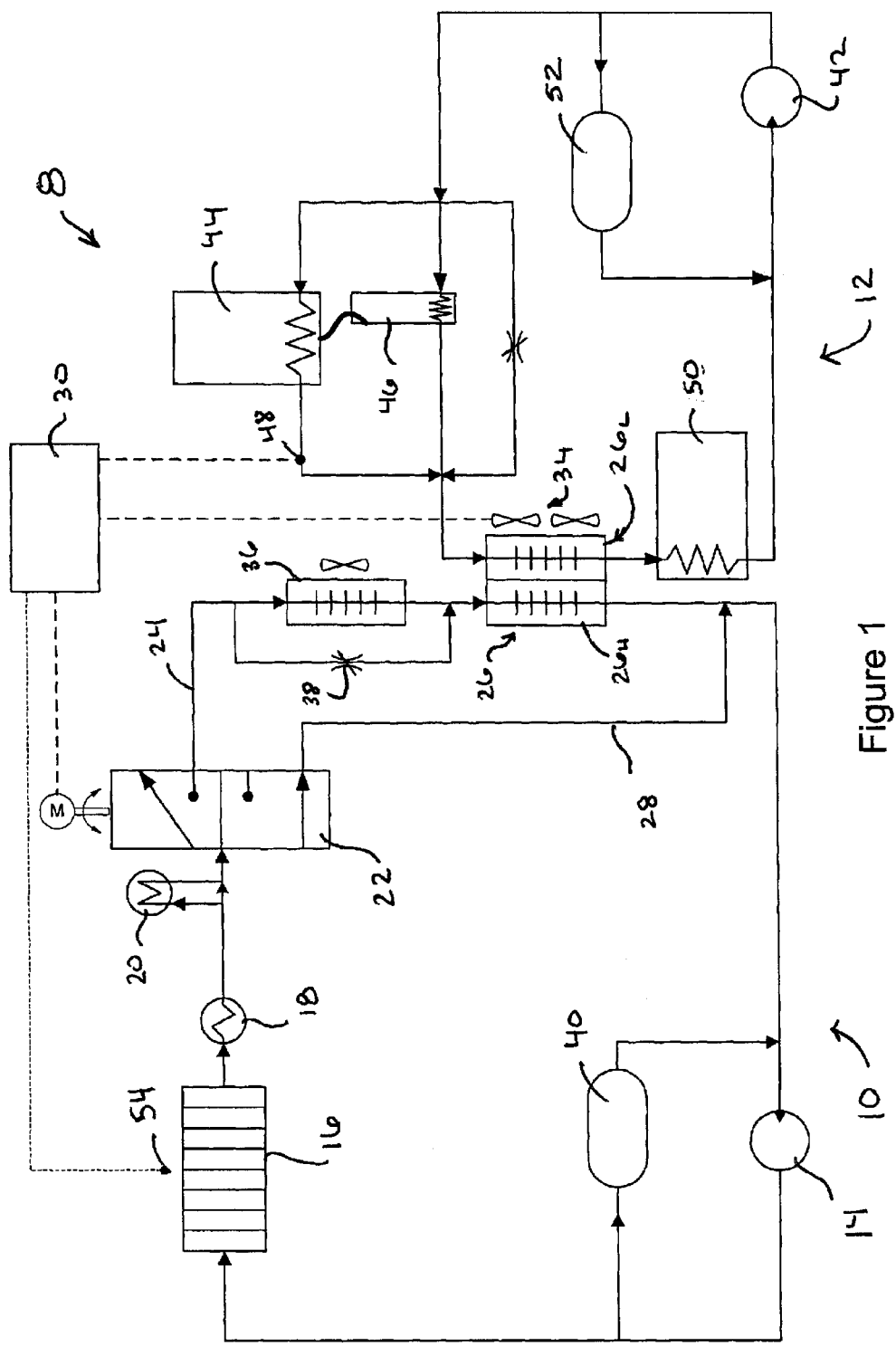
FIG. 1 is a schematic representation of a coolant system having a high temperature coolant loop and a low temperature coolant loop in accordance with the present invention.

With reference to FIG. 1, a coolant system 8 for a vehicular application is illustrated including a high temperature coolant loop 10 and a low temperature coolant loop 12. The high temperature coolant loop 10 operates in a range of about 80° C. to 100° C., and the low temperature coolant loop 12 operates in a range of about 40° C. to 50° C. In the high temperature coolant loop 10, a pump 14 circulates coolant through the coolant distribution layers (not shown) in the fuel cell stack 16 to extract the heat of the electrochemical reaction occurring therein. The pump 14 also circulates coolant through an anode gas cooler 18 and a cathode gas cooler 20 to condition the temperature of the anode and cathode gases entering the fuel cell stack 16.

A proportional diverter valve 22 is operably situated in the high temperature coolant loop 10 to direct coolant through a coolant leg 24 to a radiator 26 or through a by-pass leg 28 around the radiator 26. The diverter valve 22 is positioned in response to the temperature of the coolant in the high temperature coolant loop 10. As the temperature of the coolant within the high temperature coolant loop 10 increases, the diverter valve 22 is positioned to direct more coolant through the cooling leg 24 to the radiator 26. Conversely, as the temperature of the coolant in the high temperature coolant loop 10 decreases, the diverter valve 22 is positioned to direct more coolant through the by-pass leg 28, thereby bypassing the radiator 26. The diverter valve 22 provides an input signal to controller 30 indicating its position. The input signal or feedback from the diverter valve 22 is percentage based on a scale from 0–100, with 0 indicating a position flowing fully around (i.e., bypassing) the radiator 26 and 100 indicating a position flowing fully through the radiator 26. The position of the diverter valve 22 relates the temperature and the mass flow rate of the coolant flowing in the high temperature control loop 10, and therefore represents an approximation of the waste heat energy of the fuel cell system 8.

The use of the diverter valve 22 benefits the efficiency of the coolant system by providing more precise control over the system. When the waste heat energy is low, the diverter valve 22 minimizes the coolant flow through the radiator 26. By doing so, the restriction in coolant flow associated with the radiator 26 are reduced which in turn lowers the parasitic losses and reduces the power demand of the coolant pump 14. In addition, the ability to bypass the radiator 26 enables quick warm-up times for the fuel cell system as a whole by allow the heated coolant to re-circulate through an other "cold" fuel cell system.

As coolant moves through the high temperature coolant loop 10, heat energy is transferred to the coolant from the stack 16 and anode and cathode gas coolers 18, 20. When the heat energy in the coolant reaches a certain level, a portion of the coolant is directed through the cooling loop 24 to a high temperature section $26_H$ of the radiator 26 by diverter valve 22. This waste heat energy is then transferred to air flowing through the radiator 26. In this manner, the diverter valve 22 is used to maintain the coolant in a desired heat energy range.

In the event that the radiator 26 is not rejecting enough waste heat energy, a fan assembly 34 is located adjacent the radiator 26 and is operable to increase the air flow rate through the radiator 26. In a presently preferred embodiment, the fan assembly 34 includes two fans which are binary in nature, that is to say operates in either an "on" state or an "off" state. The controller 30 uses the diverter valve position to control operation of the fan assembly 34. Specifically, when the diverter valve 22 is at a first predetermined position, the fan assembly 34 is commanded to turn on (i.e., is enabled). The fan assembly 32 remains on until the diverter valve 22 is adjusted to a second position at which point the fan assembly 34 is commanded to turn off (i.e., is disabled). Additional details of the fan assembly control will be discussed below.

Controlling the fan assembly 34 as a function of the position of the diverter valve 22 ensures that the fan assembly 34 operates only when the coolant system would otherwise be unable to reject the waste heat energy. In this regard, the coolant flow rate through the radiator 26 (which is dictated by the position of the diverter valve 22) functions as the primary control parameter for dissipating the waste heat energy. That is to say that for a given increase in waste heat energy, the diverter valve 22 is positioned to direct more coolant flow through the radiator 26, thereby achieving a greater heat transfer from the coolant without enabling the fan assembly 34. The air flow rate through the radiator 26 (which is dictated by the state of the fan assembly 34) functions as the secondary control parameter for dissipating waste heat energy. That is to say that the fan assembly 34 is only enabled when the flow rate of coolant through the radiator 26 is inadequate to dissipate necessary waste heat energy. In this manner, the present invention minimizes the operation of the fan assembly 34 over a control scheme based solely on the coolant temperature.

The cooling leg 24 may optionally include a cabin heater 36 which provides a directed source of heat, for example to the interior or passenger compartment of a vehicle. The cabin heater 36 may be selectively bypassed through actuation of a bypass valve 38. The high temperature coolant loop 10 further includes an accumulation tank 40 which provides additional capacity of coolant for maintaining an adequate coolant volume within the high temperature coolant loop 10.

In the low temperature coolant loop 12, a pump 42 circulates coolant through various components of the fuel cell power plant. By way of example, such components cooled by the low temperature coolant loop 12 may include a motor 44, a motor controller 46 and electrical components 50 such as DC/DC converters. In general, the pump 42 circulates coolant through a heat exchanger associated with the low temperature component to extract heat therefrom. The coolant then circulates through a low temperature section $26_L$ of the radiator 26. As coolant moves through the low temperature section $26_L$, the waste heat energy is transferred to air flowing through the radiator 26 in a manner similar to that heretofore described with respect to the high temperature coolant loop 10.

The controller 30 receives a control signal from a temperature sensor 48 in the low temperature coolant loop 12 to control operation of the fan assembly 34 as a function of the temperature of the low temperature coolant loop 12. Specifically, when the temperature in the low temperature coolant loop 12 is greater than a first predetermined temperature, the fan assembly 34 is commanded to turn on. The fan assembly 34 remains on until the temperature within the low temperature coolant loop 12 drops below a second predetermined temperature. The low temperature coolant loop 12 further includes an accumulation tank 52 which provides additional capacity of low temperature coolant to maintain an adequate coolant volume within the low temperature coolant loop 12.

In addition to increasing the air flow rate through the radiator 26, fan assembly 34 increases the air flow rate around the components of the fuel cell power plant (i.e., in the "engine" compartment), and thus increases the convection cooling rate of these "under hood" components. In this regard, the controller 30 receives a control signal from a temperature sensor 54 located adjacent a component of the fuel cell power plant such as fuel cell stack 16 or other components of the fuel cell power plant. Temperature sensor 54 could also be the maximum of several "under hood" temperatures, including internal controller temperatures. The controller 30 uses the localized ambient temperature to control operation of the fan assembly 34. Specifically, when the localized ambient temperature is greater than a first predetermined temperature, the fan assembly 34 is commanded to turn on, and when the localized ambient temperature is below a second predetermined temperature the fan assembly 34 is commanded to turn off.

As will be appreciated from the foregoing description of the preferred embodiment, the fan assembly serves three functions. First, the fan is used to move cooler air from the surrounding environment through the engine compartment to keep under hood components within their operating temperature range (i.e., ambient temperature coolant loop). Second, the air that is drawn through the engine compartment passes through an air to liquid heat exchanger (low temperature radiator section $26_L$) used to cool lower temperature components (i.e., low temperature coolant loop). Lastly, the air that passes through the low temperature loop radiator section $26_L$ is also drawn through an air to liquid heat exchanger (i.e., high radiator section $26_H$) used to cool higher temperature components (i.e., high temperature coolant loop).

Figure 2:
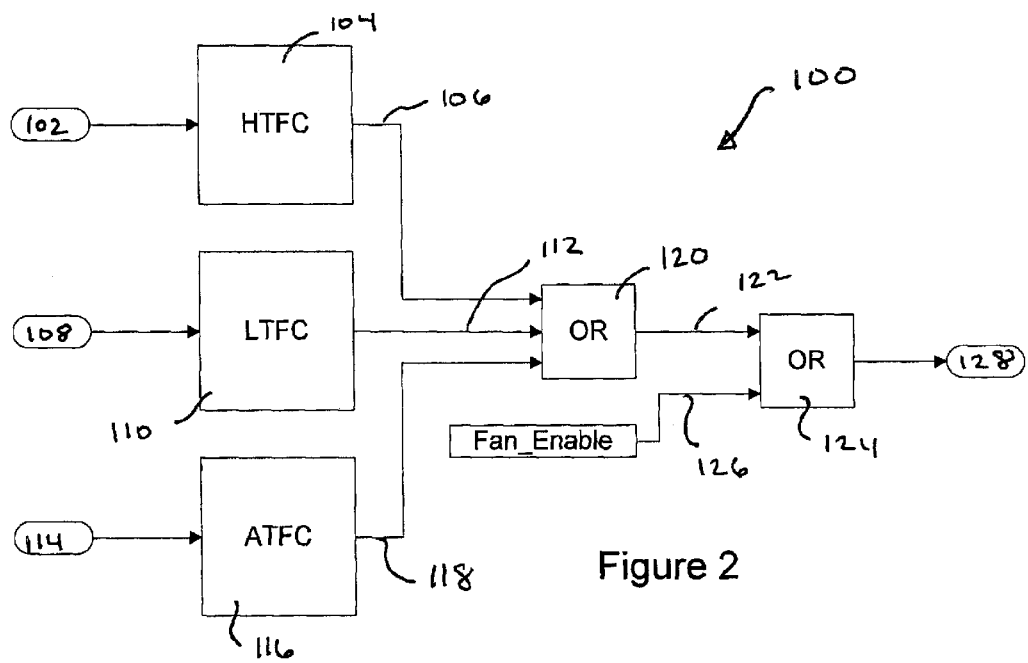
FIG. 2 illustrates the fan control priority for the coolant system.

With reference now to FIG. 2, the fan control priority circuit 100 employed by the controller 30 is illustrated. The diverter valve 22 outputs a control signal 102 which represents the position of the diverter valve 22. The control signal 102 is input to the high temperature fan control (HTFC) block 104 which outputs a control signal 106 for the fan assembly 34. The temperature sensor 48 outputs a control signal 108 which represents the temperature of the coolant in the low temperature coolant loop 12. The control signal 108 is input to low temperature fan control (LTFC) block 110 which outputs a low temperature fan control signal 112 for the fan assembly 34. The temperature sensor 54 outputs a control signal 114 which represents the localized ambient temperature. The control signal 114 is input to the ambient temperature fan control (ATFC) block 116 which outputs a control signal 118 for the fan assembly 34. The control signals 106, 112, 118 from control blocks 104, 110, 116 are directed to a logic OR operator block 120 which outputs a control signal 122. When any of the input control signals 106, 112, 118 are in a high state, the control signal 122 is likewise in a high state. Conversely, when all of the input control signals 106, 112, 118 are in a low state, the control signal 122 is likewise in a low state. The control signal 122 is directed to a logic OR operator block 124 which also receives a fan enable control signal 126 and outputs an fan control signal 128. When either of the control signals 122, 126 are in a high state, the fan control signal 128 is likewise in a high state. Conversely, when both of the control signals 122, 126 are in a low state, the fan control signal 128 is likewise in a low state.

Figure 3:
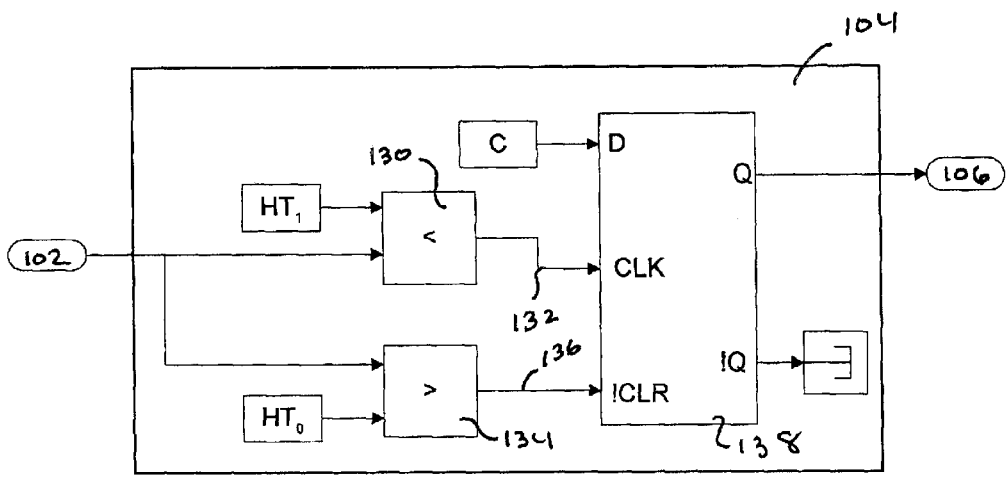
FIG. 3 illustrates a preferred implementation of the fan control logic for the high temperature coolant loop.

The HTFC block 104 is a comparative control block in which the state of the output control signal 106 is based on a comparison of the input control signal 102 which is representative of the diverter valve position and a predetermined value. With reference now to FIG. 3, the HTFC block 104 is illustrated in further detail. The input control signal 102 is directed to a fan-on comparator block 130 which outputs a control signal 132 based on a comparison of the input control signal 102 to a first predetermined valve position, $HT_1$. The input control signal 102 is also directed to a fan-off comparator block 134 which outputs a control signal 136 based on a comparison of the input control signal 102 to a second predetermined valve position, $HT_0$. $HT_0$ is less than (i.e., less radiator flow) or equal to $HT_1$. In a preferred embodiment, $HT_0$=50% radiator flow and $HT_1$= 75% radiator flow. A delay flip-flop 138 receives the control signals 132, 136 and outputs a fan control signal which enables the fan assembly 34 when the position of the diverter valve 22 is greater than the first predetermined valve position, $HT_1$ or disables the fan assembly 34 when the position of the diverter valve 22 is less than the second predetermined valve position $HT_0$. Thus, the HTFC block 104 provides a delay or hysteresis in the control system which enables the fan assembly 34 when the diverter valve 22 is in a first position and disables the fan assembly 34 when the diverter valve 22 is in a second position.

Figure 4:
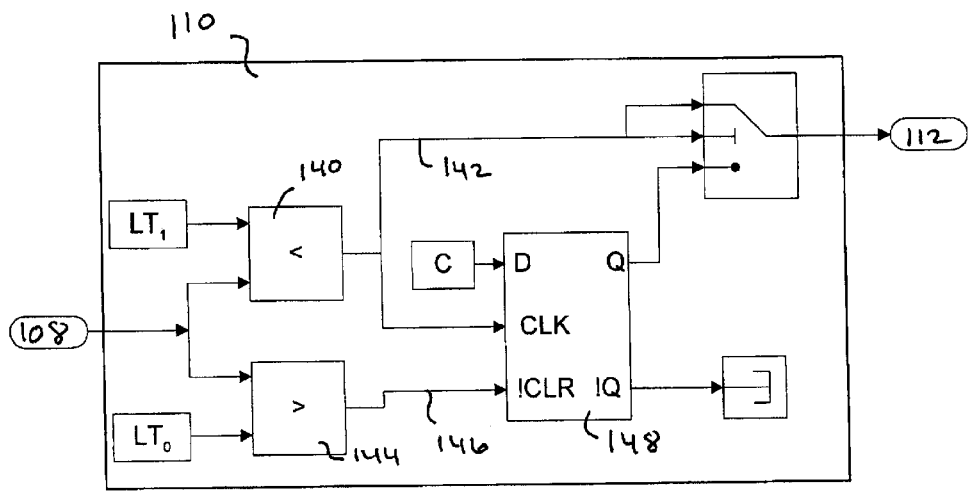
FIG. 4 illustrates a preferred implementation of the fan control logic for the low temperature coolant loop.

The LTFC block 110 is a comparative control in which the state of the output control signal 112 is based on a comparison of the input control signal 108 which is representative of the temperature of the coolant in the low temperature coolant loop 12 and a predetermined value. With reference now to FIG. 4, the LTFC block 110 is illustrated in further detail. The input control signal 108 is directed to a fan-on comparator block 140 which outputs a control signal 142 based on a comparison of the input control signal 108 to a first predetermined temperature, $LT_1$. The input control signal 108 is also directed to a fan-off comparator block 144 which outputs a control signal 146 based on a comparison of the input control signal 110 to a second predetermined temperature, $LT_0$. $LT_0$ is a value less than or equal to $LT_1$. In a preferred embodiment, $LT_0$=42° C. and $LT_1$=46° C. A delay flip-flop 148 receives the control signals 142, 146 and outputs a fan control signal which enables the fan assembly 34 when the temperature in the low temperature coolant loop 12 is greater than the predetermined value $LT_1$ or disables the fan assembly 34 when the temperature in the low temperature coolant loop 12 is less than the predetermined value $LT_0$. Thus, the LTFC block 110 further provides a delay or hysteresis in the control system which enables the fan assembly 34 when the temperature of the coolant in the low temperature coolant loop 12 is above a first temperature and disables the fan assembly 34 when the temperature of the coolant in the low temperature coolant loop 112 is below a second temperature.

Figure 5:
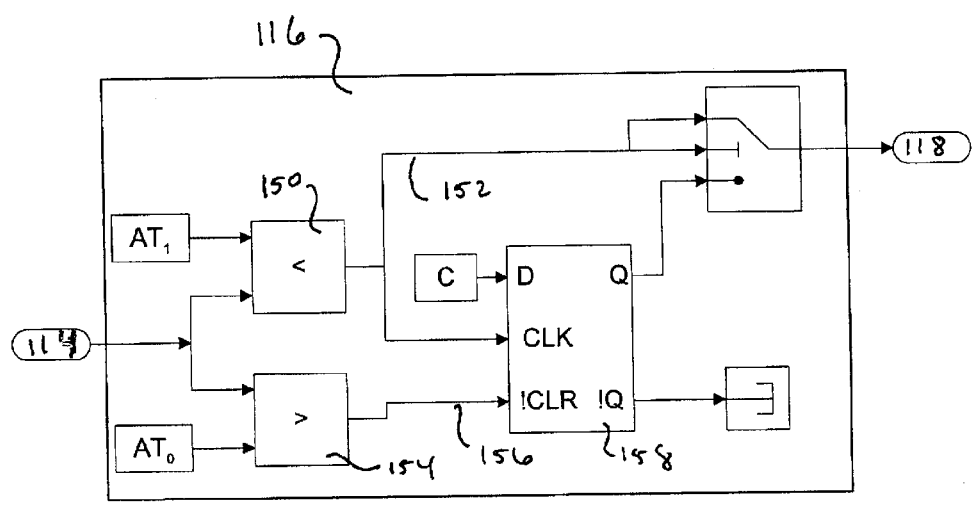
FIG. 5 illustrates a preferred implementation of the fan control logic for the underhood temperature.

The ambient temperature fan control (ATFC) 116 is a comparative control in which the state of the output control signal 118 is based on a comparison of the input control signal 114 which is representative of the localized ambient temperature and a predetermined value. With reference now to FIG. 5, the ATFC 116 is illustrated in further detail. The input control signal 114 is directed to a fan-on comparator block 150 which outputs a control signal 152 based on a comparison of the input control signal 114 to a first predetermined temperature, $AT_1$. The input control signal 114 is also directed to a fan-off comparator block 154 which outputs a control signal 156 based on a comparison of the input control signal 114 to a second predetermined temperature, $AT_0$. $AT_0$ is a value less than or equal to $AT_1$. In a preferred embodiment, $LT_0$=36° C. and $LT_1$=40° C. A delay flip-flop 158 receives the control signals 152, 156 and outputs a fan control signal which enables the fan assembly 34 when the localized ambient temperature is greater than the first predetermined temperature, $AT_1$ or disables the fan assembly 34 when the localized ambient temperature is less than the second predetermined temperature, $AT_0$. Thus, the ATFC block 116 provides a delay or hysteresis in the control system which enables the fan assembly 34 when the localized ambient temperature as measured by the temperature sensor 54 is above a first temperature and disables the fan assembly 34 when the localized ambient temperature is below a second temperature.

Systems incorporating the present invention are much more efficient in that the priority control allows the use of one fan for the three coolant subsystems within the fuel cell power plant. The fan control gives priority to the coolant system that requires heat rejection such that the fan assembly can turn on with a request from any of the three coolant subsystems.

While certain preferred values have been given herein as an exemplary control system, one skilled in the art should recognize that the control constants ($HT_1$, $HT_0$, $LT_1$, $LT_0$, $AT_1$, $AT_0$) for a given coolant system will be governed by the operating conditions of the system and heat transfer characteristic of the components thereof. The description of the preferred embodiment set forth above includes the use of a fan assembly having a pair of binary fans which are logically tied together and thus controlled in unison. However, one skilled in the art should recognize that the present invention is equally applicable to a control strategy in which the two fans are logically independent and thus controlled separately. When using independent control, a second set of thresholds could be defined such that operation of the second fan is enabled at higher heat energy and/or temperature values. The control strategy is also applicable for use in a system which employs a variable speed fan in place of the binary fan. When using a variable speed fan, the control strategy would enable the fan and set a fan speed as a function of heat energy and/or temperature values.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fan control system for a fuel cell cooling system of the type having a first coolant loop and a second coolant loop, the fan control system comprising:
    a first sensor generating a first input signal as a function of a coolant heat energy in a first coolant loop;
    a second sensor generating a second input signal as a function of a coolant temperature in a second coolant loop; and
    a controller including a first control circuit receiving said first input signal and generating a first control signal having a high state and a low state, a second control circuit receiving said second input signal and generating a second control signal having a high state and a low state, and a fan control circuit receiving said first and second control signals and generating a fan enable signal when at least one of said first and second control signals are in said high state, and generating a fan disable control signal when both said first and second control signals are in said low state.

2. The fan control system of claim 1 wherein said first control circuit provides a delay such that said first control signal has a high state when said first input signal is greater than a first predetermined value and said first control signal has a low state when said first input signal is less than a second predetermined value, said second predetermined value being less than said first predetermined value.

3. The fan control system of claim 1 wherein said first sensor generates said first input signal as a function of a position of a diverter valve controlling coolant flow through said first coolant loop.

4. The fan control system of claim 3 wherein said first control circuit provides a delay such that said first control signal has a high state when said position of said diverter valve is greater than a first predetermined value and said first control signal has a low state when said position of said diverter valve is less than a second predetermined value, said second predetermined value being less than said first predetermined value.

5. The fan control system of claim 1 wherein said second control circuit provides a delay such that said second control signal has a high state when said coolant temperature is greater than a first predetermined value and said second control signal has a low state when said coolant temperature is less than a second predetermined value, said second predetermined value being less than said first predetermined value.

6. The fan control system of claim 1 further comprising a third sensor generating a third input signal as a function of a localized ambient temperature, said controller including a third control circuit receiving said third input signal and generating a third control signal having a high state and a low state, said fan control circuit receiving said first, second and third control signals and generating a fan enable signal when at least one of said first, second and third control signals are in said high state, and generating a fan disable control signal when all of said first, second and third control signals are in said low state.

7. The fan control system of claim 6 wherein said localized ambient temperature is a maximum of a plurality of localized ambient temperatures.

8. The fan control system of claim 6 wherein said third control circuit provides a delay such that said third control signal has a high state when said localized ambient temperature is greater than a first predetermined value and said third control signal has a low state when said localized ambient temperature is less than a second predetermined value, said second predetermined value being less than said first predetermined value.

9. A cooling system for a fuel cell power plant comprising:
    a radiator having a first radiator section in fluid communication with a first coolant loop and a second radiator section in fluid communication with a second coolant loop and a fan disposed adjacent said radiator and operable to pass air through said first and second radiator sections; and
    a fan control system including:
    a first sensor generating a first input signal as a function of a coolant heat energy in a first coolant loop;
    a second sensor generating a second input signal as a function of a coolant temperature in a second coolant loop; and
    a controller including a first control circuit receiving said first input signal and generating a first control signal having a high state and a low state, a second control circuit receiving said second input signal and generating a second control signal having a high state and a low state, and a fan control circuit receiving said first and second control signals and generating a fan enable signal to turn said fan on when at least one of said first and second control signals are in said high state, and generating a fan disable control signal to turn said fan off when both said first and second control signals are in said low state.

10. The cooling system of claim 9 wherein said first control circuit provides a delay such that said first control signal has a high state when said first input signal is greater than a first predetermined value and said first control signal has a low state when said first input signal is less than a second predetermined value, said second predetermined value being less than said first predetermined value.

11. The cooling system of claim 9 wherein said first coolant loop includes a diverter valve controlling coolant flow through said first coolant loop and said first sensor generates said first input signal as a function of a diverter valve position.

12. The cooling system of claim 11 wherein said first control circuit provides a delay such that said first control signal has a high state when said diverter valve position is greater than a first predetermined value and said first control signal has a low state when said diverter valve position is less than a second predetermined value, said second predetermined value being less than said first predetermined value.

13. The cooling system of claim 9 wherein said second control circuit provides a delay such that said second control signal has a high state when said coolant temperature is greater than a first predetermined value and said second control signal has a low state when said coolant temperature is less than a second predetermined value, said second predetermined value being less than said first predetermined value.

14. The cooling system of claim 9 further comprising a third sensor generating a third input signal as a function of a localized ambient temperature, said controller including a third control circuit receiving said third input signal and generating a third control signal having a high state and a low state, said fan control circuit receiving said first, second and third control signals and generating a fan enable signal to turn said fan on when at least one of said first, second and third control signals are in said high state, and generating a fan disable control signal to turn said fan off when all of said first, second and third control signals are in said low state.

15. The cooling system of claim 14 wherein said localized ambient temperature is a maximum of a plurality of localized ambient temperatures.

16. The cooling system of claim 14 wherein said third control circuit provides a delay such that said third control signal has a high state when said localized ambient temperature is greater than a first predetermined value and said third control signal has a low state when said localized ambient temperature is less than a second predetermined value, said second predetermined value being less than said first predetermined value.

17. A method for controlling a fan in a cooling system of a fuel cell power plant, the method comprising:

determining a heat energy of a coolant in a first coolant loop;

determining a coolant temperature of a coolant in a second coolant loop;

generating a first control signal having a high state when said heat energy is above a predetermined level and a low state when said heat energy is below said predetermined level;

generating a second control signal having a high state when said coolant temperature is above a predetermined temperature and a low state when said coolant temperature is below said predetermined temperature;

enabling a fan when at least one of said first and second control signals are in said high state; and disabling said fan when both said first and second control signals are in said low state.

18. The method of claim 17 wherein the step of generating a first control signal further comprises generating a first control signal having a high state when said heat energy is above a first predetermined level and a low state when said heat energy is below a second predetermined level, said second predetermined level being less than said first predetermined level.

19. The method of claim 17 wherein the step of determining a heat energy of a coolant in a first coolant loop comprises identifying a diverter valve position of a diverter valve in said first coolant loop to selectively direct coolant to said first radiator section.

20. The method of claim 19 wherein the step of generating a first control signal further comprises generating a first control signal having a high state when said diverter valve position is greater than a first predetermined position and a low state when said diverter valve position is less than a second predetermined position, said second predetermined level being less than said first predetermined level.

21. The method of claim 17 wherein the step of generating a second control signal further comprises generating a second control signal having a high state when said coolant temperature is above a first predetermined temperature and a low state when said coolant temperature is below a second predetermined temperature, said second predetermined temperature being less than said first predetermined temperature.

22. The method of claim 17 further comprising the steps of:

determining a localized ambient temperature;

generating a third control signal having a high state when said localized ambient temperature is above a predetermined temperature and a low state when said localized ambient temperature is below said predetermined temperature;

enabling a fan when at least one of said first, second and third control signals are in said high state; and disabling said fan when all of said first, second and third control signals are in said low state.

23. The method of claim 22 wherein the step of determining a localized ambient temperature includes determining a plurality of localized ambient temperatures and determining a maximum localized ambient temperature for such plurality of localized ambient temperatures.

24. The method of claim 22 wherein the step of generating a third control signal further comprises generating said third control signal having a high state when said localized ambient temperature is above a first predetermined temperature and a low state when said localized ambient temperature is below a second predetermined temperature, said second predetermined temperature being less than said first predetermined temperature.

* * * * *